United States Patent
Farbolin

(10) Patent No.: US 9,162,761 B2
(45) Date of Patent: Oct. 20, 2015

(54) PARTIALLY-INFLATED RIGID-STRUCTURE GLIDER

(71) Applicant: Christopher Paul Farbolin, Roswell, GA (US)

(72) Inventor: Christopher Paul Farbolin, Roswell, GA (US)

( * ) Notice: Subject to any disclaimer, the term of this patent is extended or adjusted under 35 U.S.C. 154(b) by 373 days.

(21) Appl. No.: 13/925,797

(22) Filed: Jun. 24, 2013

(65) Prior Publication Data

US 2013/0284853 A1 Oct. 31, 2013

Related U.S. Application Data

(63) Continuation-in-part of application No. 13/187,482, filed on Jul. 20, 2011, now Pat. No. 8,490,915.

(60) Provisional application No. 61/365,816, filed on Jul. 20, 2010.

(51) Int. Cl.
*B64C 31/02* (2006.01)
*B64C 1/34* (2006.01)
*B64C 3/30* (2006.01)
*B64C 31/028* (2006.01)

(52) U.S. Cl.
CPC . *B64C 31/02* (2013.01); *B64C 1/34* (2013.01); *B64C 3/30* (2013.01); *B64C 31/028* (2013.01); *B64D 2211/00* (2013.01)

(58) Field of Classification Search
CPC ........ B64C 1/34; B64C 3/30; B64C 31/0002; B64C 31/028; B64C 31/036
See application file for complete search history.

(56) References Cited

U.S. PATENT DOCUMENTS 4,424,946 A * 1/1984 Kramer .......................... 244/13
4,858,854 A * 8/1989 Jacobson ................. 244/123.11

* cited by examiner

*Primary Examiner* — Nicholas McFall

(57) ABSTRACT

A partially-inflated rigid-structure glider is a portable or collapsible gliding apparatus that a user can transport in a carrying case. The gliding apparatus includes a rigid yet collapsible frame, tension membranes over both on the wings and tail, and inflatable bladder, a pair of drogue brakes, and a left and right steering mechanism. The pair of drogue brakes is located on opposing sides of the gliding apparatus and create drag on its respective side in order to turn the gliding apparatus either left or right. The user can activate either drogue brake with the left and right steering mechanism, which are control lines attached to each drogue brake. The tension membranes are fitted over the frame so that the gliding apparatus has an airfoil shape in order to create lift with the wings and tail while the gliding apparatus is in flight.

17 Claims, 13 Drawing Sheets

PARTIALLY-INFLATED RIGID-STRUCTURE GLIDER

The current application is a continuation-in-part of U.S. utility patent application Ser. No. 13/187,482 filed on Jul. 20, 2011, which is a non-provisional of U.S. provisional patent application 61/365,816 filed on Jul. 20, 2010.

FIELD OF THE INVENTION

The present invention relates generally to an air glider. More specifically, the present invention is a glider with a partially-inflated, partially-rigid structure that can be collapsed into a portable form.

BACKGROUND OF THE INVENTION

Traditionally, the air gliders have either used ram air inflation or a rigid structure as a means of aerodynamic lift. A paraglider inflates a cell structured canopy with ram air pressure in order to produce the necessary aerodynamic lift to glide an individual through the air. The cell structured canopy allows the individual to better control of the paraglider but glides at a slower speed. The paraglider usually requires no assembly and relatively weighs less than an air glider with a frame. A hang glider uses a rigid structure and fabric to form its wings, which produces the necessary aerodynamic lift to glide an individual through the air. The rigid structured wings allow the hang glider to glide at faster speeds but reduce the individual's ability to the control the hang glider. Because the hang glider has a frame, the hang glider requires some assembly time and relatively weighs more than the paraglider. The present invention is an air glider, which uses both a partially-inflated structure and a partially rigid structure. The wings of the present invention provide the aerodynamic lift necessary to glide an individual through the air and are shaped by controlled inflation through a gas tank and by a rigid structure. The inflatable portion of the present invention's structure provides a definite shape for the leading edges of its wings and allows the present invention to glide at speeds faster than a paraglider. The present invention is relatively easier to assemble than a hang glider and has a weight comparable to the weight of a paraglider.

DETAILED DESCRIPTIONS OF THE INVENTION

Figure 1:
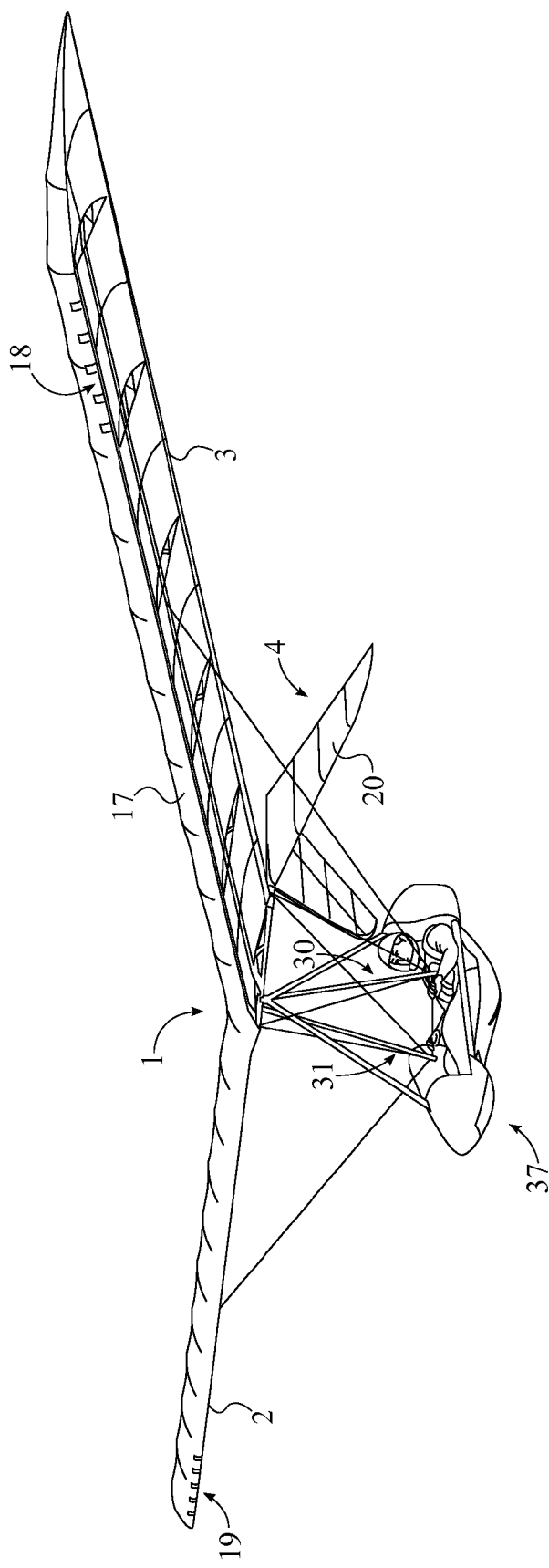
FIG. 1 is a front perspective view of the present invention.
Figure 2:
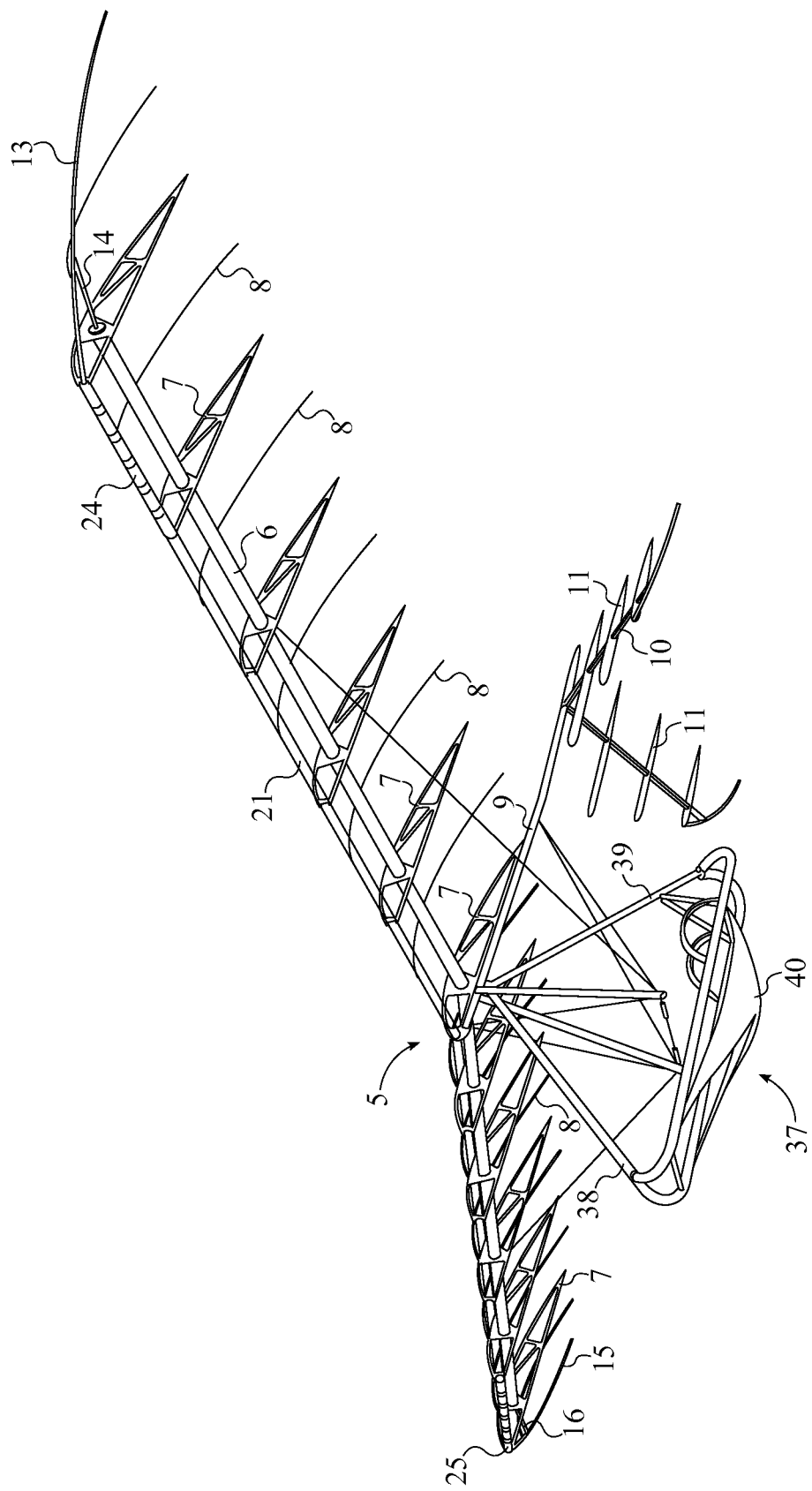
FIG. 2 is a front perspective view of the frame and the pilot pod for the present invention.
Figure 3A:
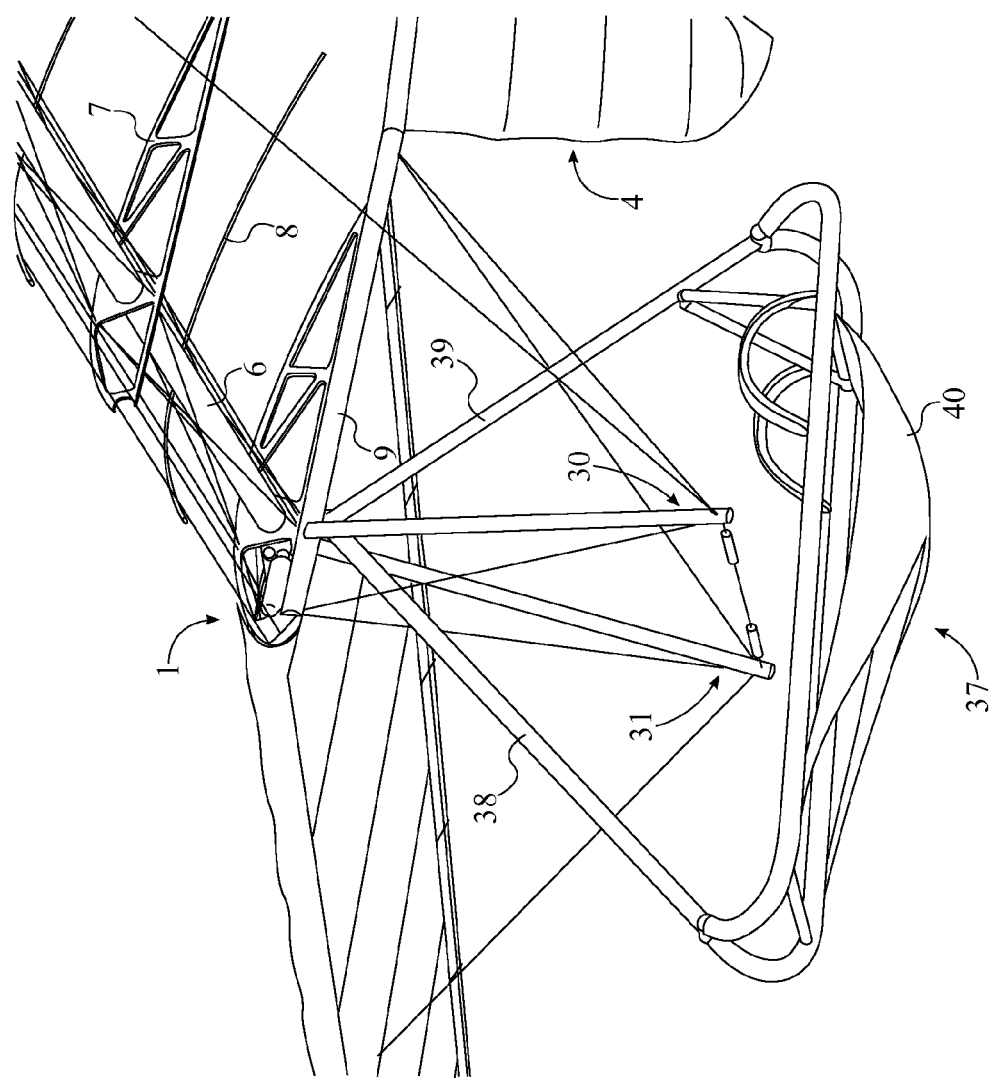
FIG. 3A is a front perspective view highlighting the pilot pod, the left steering mechanism, and the right steering mechanism.
Figure 3B:
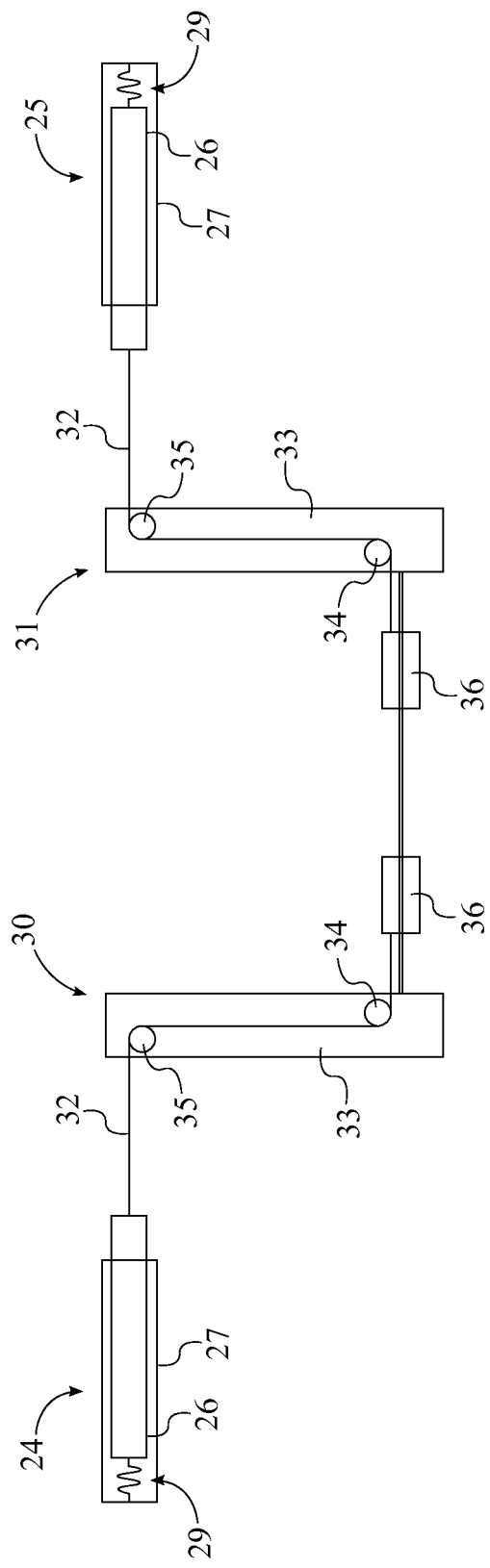
FIG. 3B is a schematic view of the left drogue brake, the left steering mechanism, the right drogue brake, and the right steering mechanism for the present invention.
Figure 4:
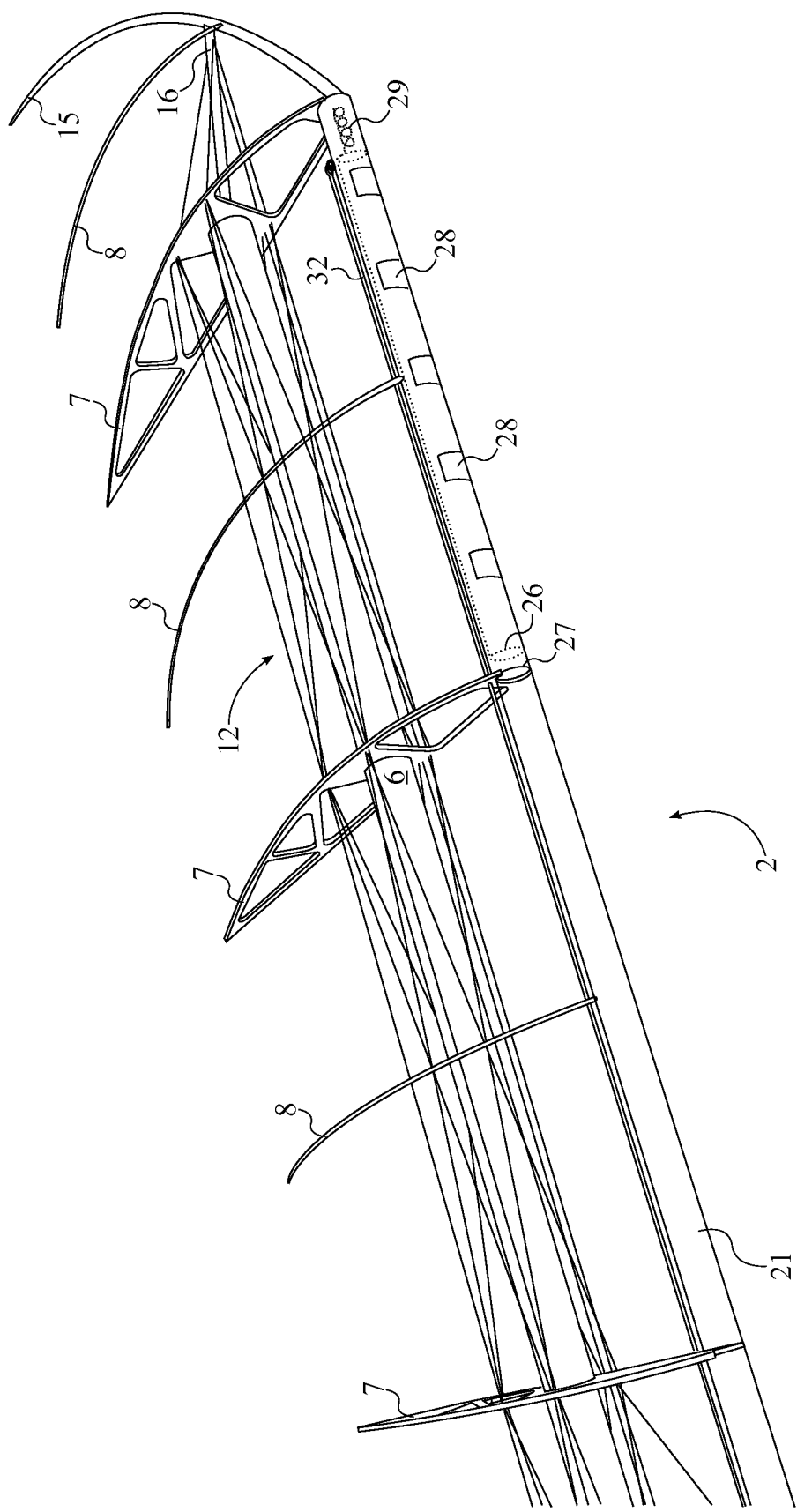
FIG. 4 is a front perspective view of the left wing for the present invention.
Figure 5:
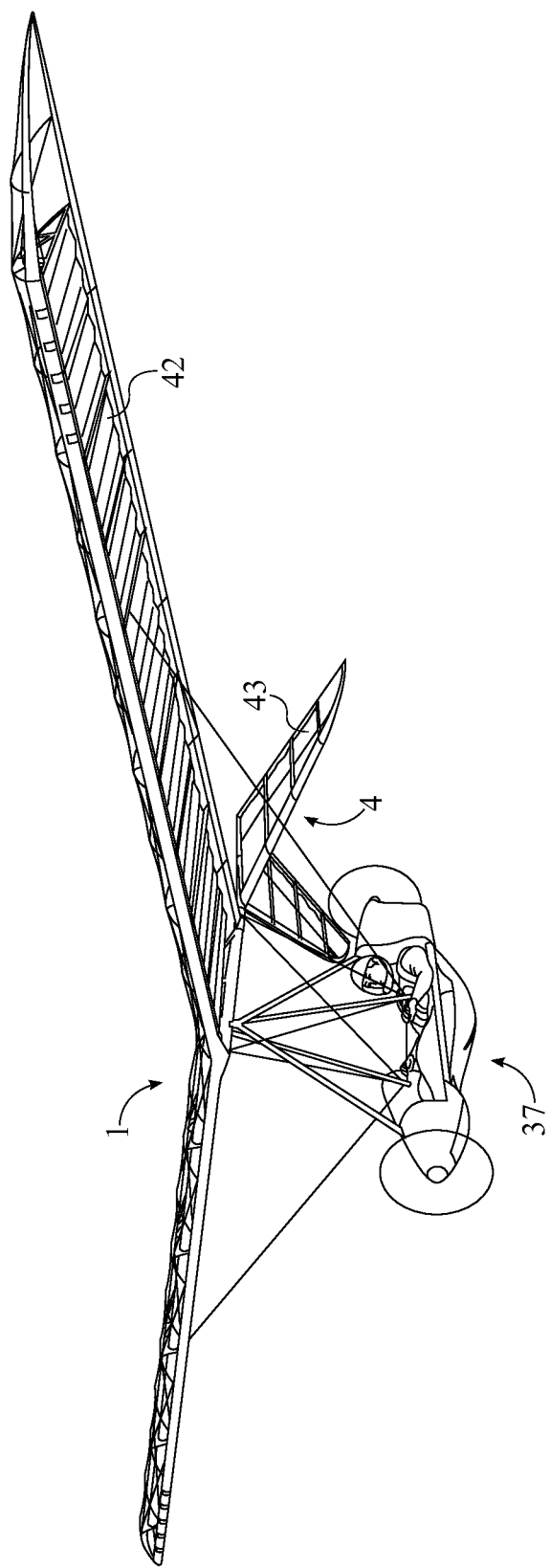
FIG. 5 is a front perspective view highlighting the solar panels on the wings and the tail for the present invention.
Figure 6:
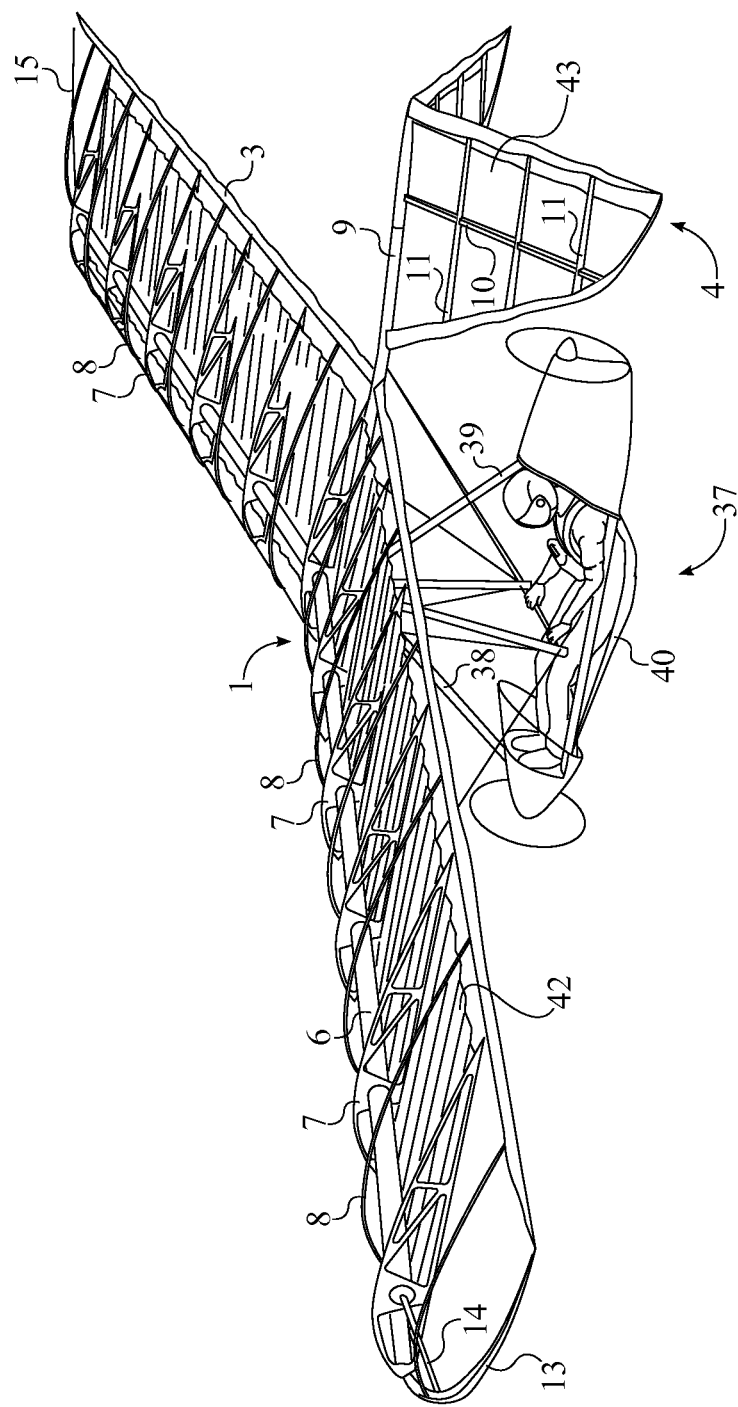
FIG. 6 is a back perspective view highlighting the solar panels on the wings and tail for the present invention.
Figure 7:
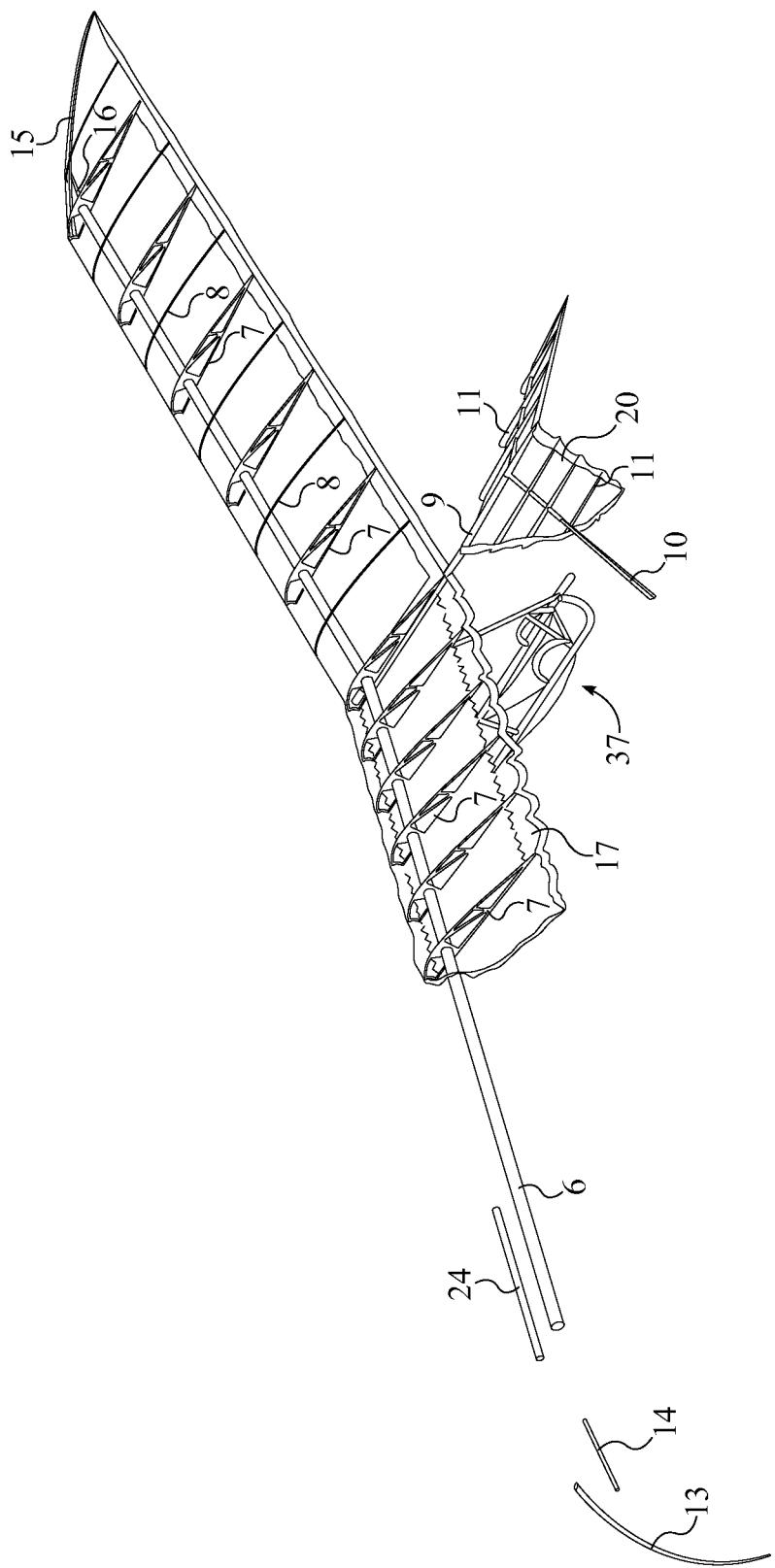
FIG. 7 is a back perspective view showing how to release the tension from the wing skin and the tail skin for the present invention.
Figure 8:
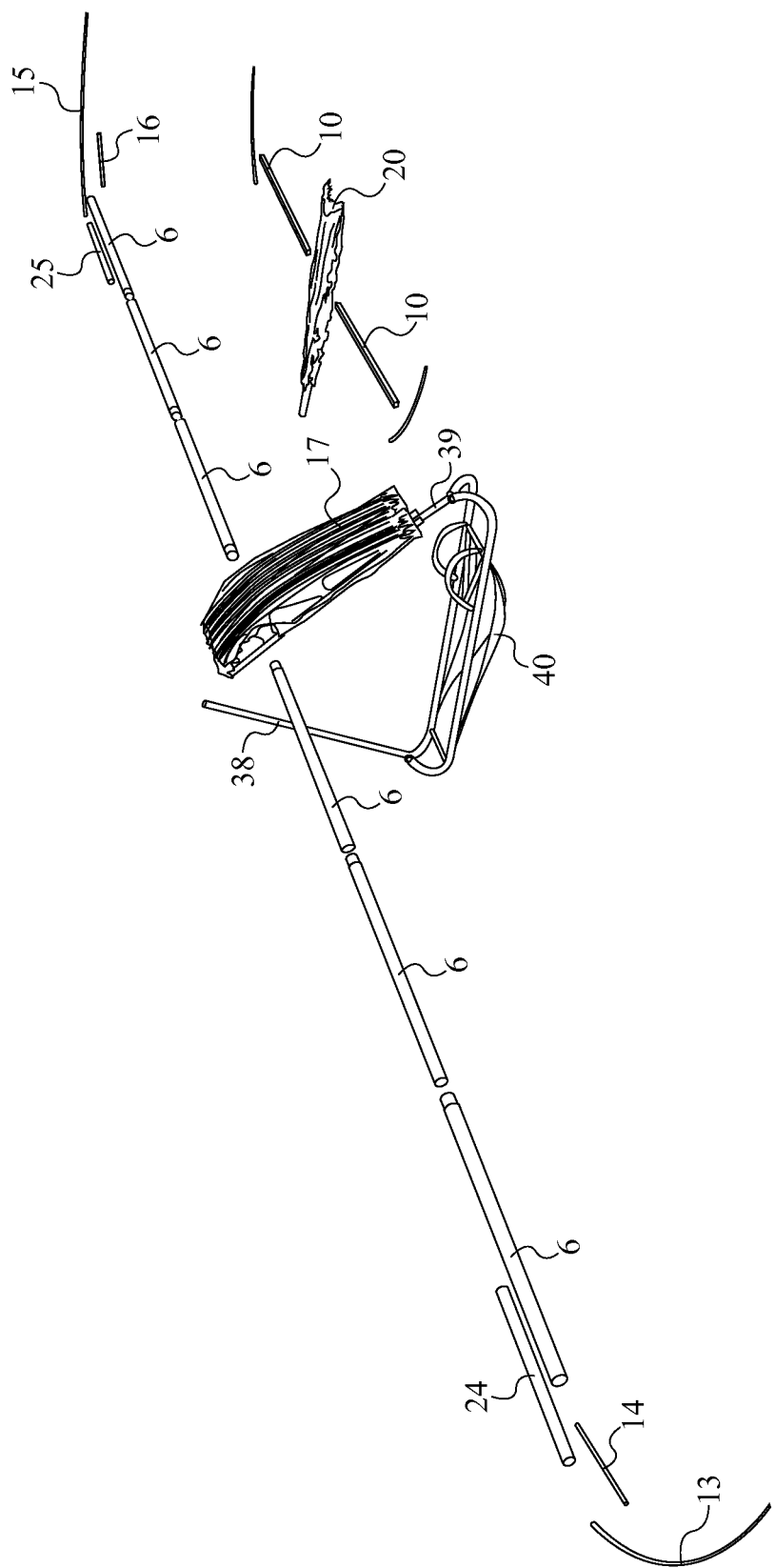
FIG. 8 is a back perspective view showing the wing skin and the tail skin being compressed towards the center of the present invention.
Figure 9:
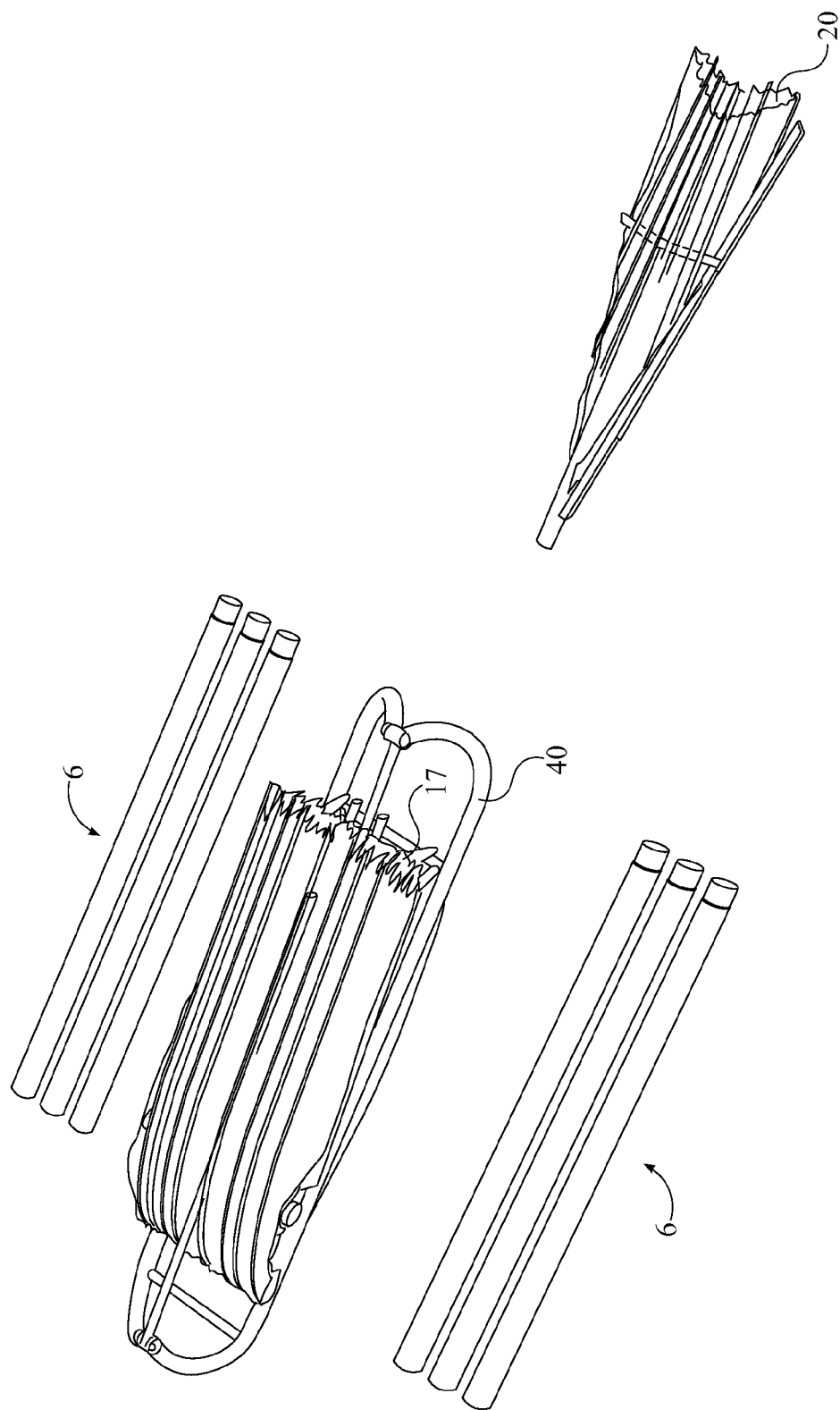
FIG. 9 is a perspective view of the major components for present invention being made ready to store within a carrying case.
Figure 10:
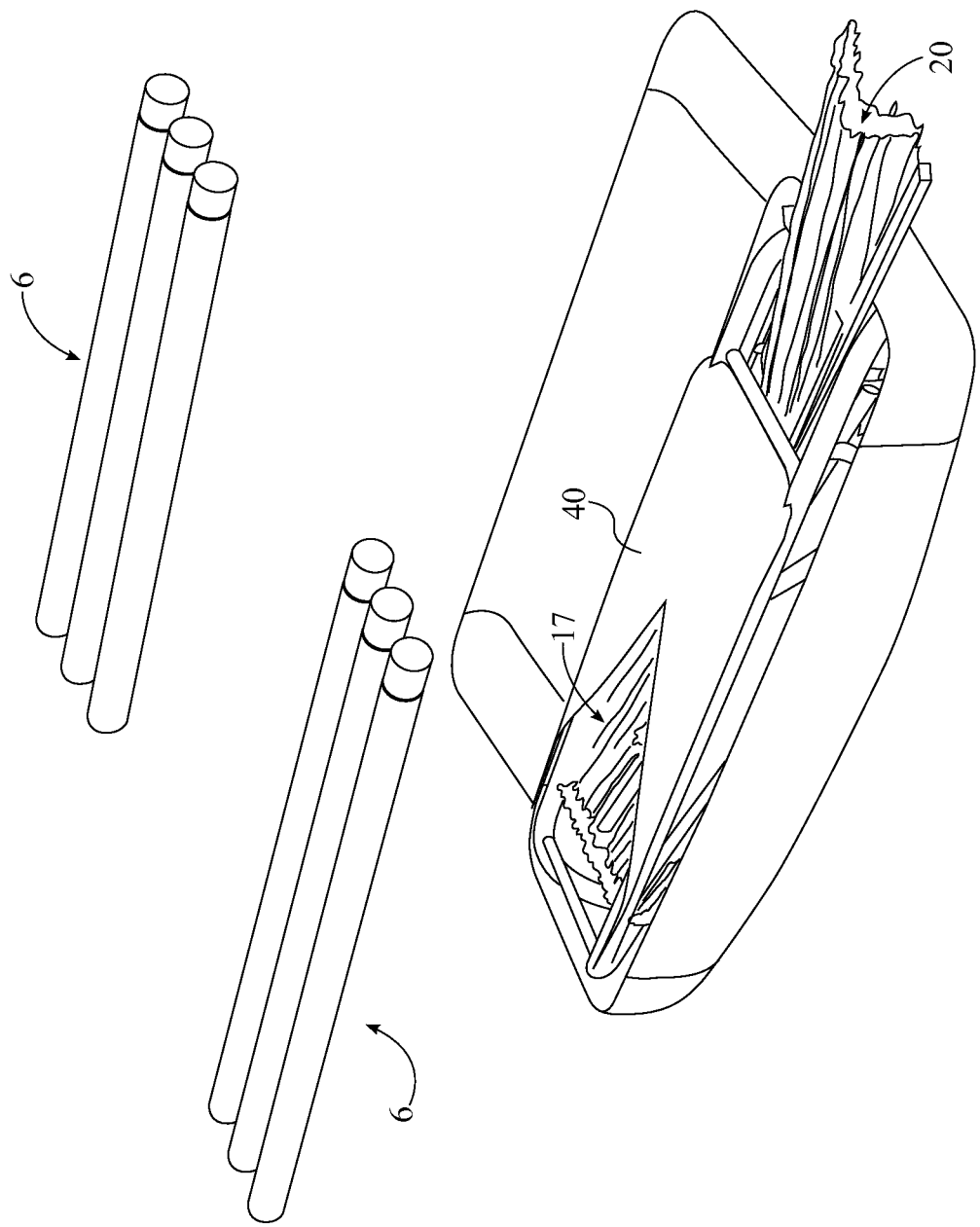
FIG. 10 is a perspective of the major components of the present invention being loaded into the carrying case.
Figure 11:
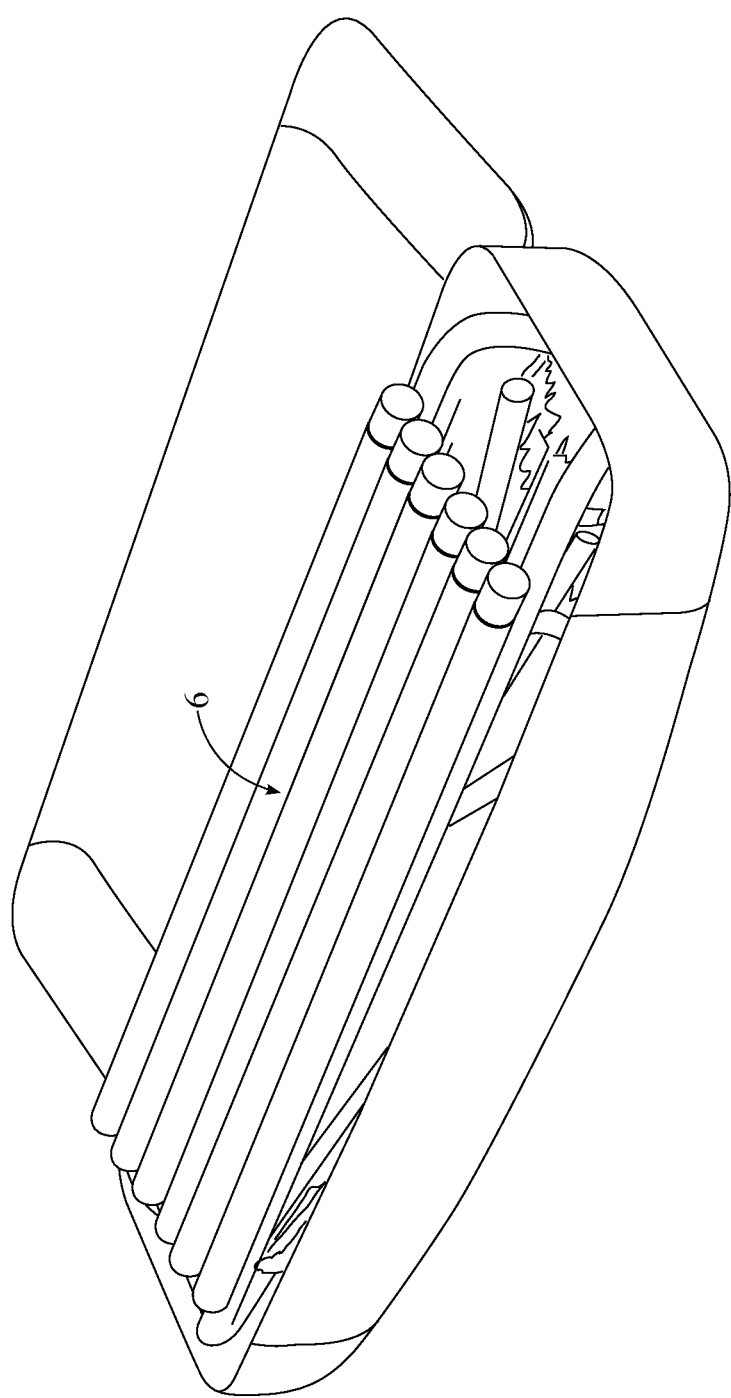
FIG. 11 is a perspective view of how the major component of the present invention should be fitted into the carrying case.
Figure 12:
FIG. 12 is a perspective view of a user transporting the present invention in its collapsed state within the carrying case.

All illustrations of the drawings are for the purpose of describing selected versions of the present invention and are not intended to limit the scope of the present invention.

The present invention is a partially-inflated rigid-structure glider, which provides the user with a portable apparatus to glide through the air. The wings and empennage of the present invention is shaped by a combination of a rigid and inflatable structure and an outer covering. The present invention is collapsible and can be stored in small areas such as the trunk of an automobile, a storage compartment on a bus or train, or a closet. The present invention comprises a pair of wings 1, a tail 4, a frame 5, a wing skin 17, a tail skin 20, an inflatable bladder 21, an inflation tank 22, a left drogue brake 24, a right drogue brake 25, a left steering mechanism 30, a right steering mechanism 31, and a pilot pod 37. The pair of wings 1 provides the present invention with the aerodynamic lift to keep the present invention gliding through the air. The tail 4 provides the present invention with the longitudinal stability to prevent any movement in the pitch while the present invention is in flight. In the preferred embodiment of the present invention, the pair of wings 1 is positioned at a dihedral angle in order to increase stability about the roll axis, and the tail 4 is positioned at an anhedral angle. The frame 5 is the rigid structure and provides a base for all the other components of the present invention to be connected together. The wing skin 17 and the tail skin 20 are outer coverings that allow the pair of wings 1 and the tail 4 to maintain the airfoil shapes though their entire lengths. The wing skin 17 is a tension membrane for the pair of wings 1, and the tail skin 20 is a tension membrane for the tail 4. The airfoil shape provides the pair of wings 1 with a leading edge 2 and a trailing edge 3. The inflatable bladder 21 is positioned along the leading edge 2 in order to maintain a consistent aerodynamic shape for the entire length of the leading edge 2. When the present invention is in the collapsed state, the inflation tank 22 is used to pressurize the inflatable bladder 21. The left drogue brake 24 and the right drogue brake 25 is used turn the present invention left or right while the present invention is in flight. The left steering mechanism 30 allows the user to control the left drogue brake 24 in order to turn left, and the right steering mechanism 31 allows the user to control the right drogue brake 25 in order to turn right. The pilot pod 37 carries the user while the present invention is gliding through the air.

The present invention is structurally defined by the frame 5. The frame 5 comprises a spar 6, a plurality of wing ribs 7, a plurality of battens 8, a keel 9, a tail frame 10, a plurality of tail ribs 11, a network of lines 12, a left tip wand 13, a left tip strut 14, a right tip wand 15, and a right tip strut 16. The spar 6 is the main structural beam that runs along the length of the pair of wings 1. The spar 6 acts as a cantilever on which each of the pair of wings 1 is founded upon. The keel 9 is another structural beam that positions and supports the tail 4 at an appropriate distance away from the pair of wings 1. The keel 9 is perpendicularly positioned and attached to the center of the spar 6. The tail frame 10 is the internal structure of the tail 4 and is attached to the keel 9 opposite to the spar 6. The plurality of wing ribs 7 is a set of structural panels for the pair of wings 1 that have an airfoil shape. The plurality of wing ribs 7 is evenly distributed along the pair of wings 1 so that the airfoil shape remains consistent through the pair of wings 1. The plurality of wing ribs 7 is interconnected to each other through the network of lines 12. If the network of lines 12 is in tension, then the network of lines 12 evenly spaces the plurality of wing ribs 7 from each other. In addition, each of the plurality of wing ribs 7 is slidably engaged to the spar 6 so that the wing ribs 7 can be moved inwards or outwards from the keel 9 while either assembling or dissembling the present invention. The plurality of battens 8 is a set of lightweight, structural rods that also help to maintain the airfoil shape along the pair of wings 1. The plurality of battens 8 is distributed in between the plurality of wing ribs 7 in order to further maintain the airfoil shape along the pair of wings 1 without adding too much additional weight to the present invention. The plurality of battens 8 is directly connected to the wing skin 17, and, in the preferred embodiment of the present invention, the plurality of battens 8 is only used to maintain the top of the airfoil shape. The plurality of tail ribs 11 is a set of structural panels for the tail 4 and, thus, is evenly distributed along the length of the tail 4. Similar to the plurality of wing ribs 7, the plurality of tail ribs 11 is slidably engaged to the tail frame 10 so that the tail 4 ribs can be moved inwards or outwards from the keel 9 while either assembling or dissembling the present invention.

The left outer portion and the right outer portion for the pair of wings 1 have a specific configuration to allow the present invention to steer left or right and to disassemble. The plurality of wing ribs 7 comprises a left outermost rib, a left secondmost outer rib, a right outermost rib, and a right second-most outer rib. The left drogue brake 24 and the right drogue brake 25 are respectively used to turn the left or right. The drag created by activating either the left drogue brake 24 or the right drogue brake 25 will cause the present invention to turn in its respective direction. In addition, the left drogue brake 24 and the right drogue brake 25 are positioned along the leading edge 2 for the pair of wings 1, which allows either the left drogue brake 24 or the right drogue brake 25 to provide the most drag as the air flows around the airfoil shape for the pair of wings 1. The left drogue brake 24 is attached in between the left outermost rib and the left second-most outer rib, which allows the left drogue brake 24 to better apply the necessary torque on the present invention in order to steer the present invention to the left. Likewise, the right drogue brake 25 is attached in between the right outermost rib and the right second-most outer rib, which allows the right drogue brake 25 to better apply the necessary torque in order to steer the present invention to the right. The left tip wand 13 and the right tip wand 15 shape the ends of the pair of wings 1. The left tip wand 13 is attached to the left outermost rib adjacent to the left drogue brake 24, and the right tip wand 15 is attached to the right outermost rib adjacent to the right drogue brake 25. Consequently, the left tip wand 13 and the right tip wand 15 are used as the final assembling pieces for the present invention that stretch the wing skin 17 to the proper tension, which allows air to flow past the pair of wings 1 and produce lift on the present invention. Initially, the left tip wand 13 and the right tip wand 15 are straight, flexible pieces of material, but, while assembling the present invention, the left tip wand 13 and the right tip wand 15 are bent to provide the wing skin 17 with the proper tension. In addition, the frame 5 further comprises a left tip strut 14 and a right tip strut 16. The left tip strut 14 is attached between the left outermost rib and the left tip wand 13, which allows the left tip strut 14 to brace the left tip wand 13 against the left outermost rib. Similarly, the right tip strut 16 is attached between the right outermost rib and the right tip wand 15, which allows the right tip strut 16 to brace the right tip wand 15 against the right outermost rib.

The wing skin 17 is a cover for the structural portion of the pair of wings 1 that creates an airfoil shaped body for the entire length of the pair of wings 1. Thus, the wing skin 17 conformingly encloses the plurality of wing ribs 7, the left tip wand 13, and the right tip wand 15 in order to create the airfoil shaped body and produce the necessary lift with the pair of wings 1 while the present invention is in flight. The wing skin 17 is tightly wrapped around the structural portion of the pair of wings 1 in order to prevent wrinkles in the wing skin 17 that could create unnecessary drag while the present invention is in flight. The wing skin 17 also comprises a left brake opening 18 and a right brake opening 19, which are specifically positioned holes in the wing skin 17 to allow air to flow into the left drogue brake 24 and the right drogue brake 25. Consequently, the left brake opening 18 is positioned along the leading edge 2 adjacent to the left drogue brake 24, and the right brake opening 19 is positioned along the leading edge 2 adjacent to the right drogue brake 25. Similar to the wing skin 17, the tail skin 20 is a cover for the structural portion of the tail 4 that creates an airfoil shaped body of the entire length of the tail 4. Thus, the tail skin 20 is conformingly encloses the plurality of tail ribs 11 and the tail frame 10 in order to create the airfoil shaped body and to stabilize the present invention from the tail 4 while the present invention is in flight.

In one embodiment of the present invention, the wing skin 17 and the tail skin 20 are transparent because a wing solar panel 42 is located within the pair of wings 1 and because a tail solar panel 43 is located within the tail 4. The wing solar panel 42 is positioned across the pair of wings 1, and the tail solar panel 43 is positioned across the tail 1, which allows provides the present invention with the maximum surface area to collect solar energy through the wing solar panel 42 and the tail solar panel 43. The wing solar panel 42 and the tail solar panel 43 allow the present invention to collect electrical power while the present invention is in flight. The electrical power collected by the wing solar panel 42 and the tail solar panel 43 can be used to power a propulsion device for the present invention such as a propeller. Both the wing solar panel 42 and the tail solar panel 43 are foldable, which allows the pair of wings 1 and the tail 4 to be compressed while the present invention is being collapsed. The wing solar panel 42 is connected to each of the plurality of wing ribs 7 so that the wing solar panel 42 is supported through the entire length of the pair of wings 1. Similarly, the tail solar panel 43 is connected to each of the plurality of tail ribs 11 so that the tail solar panel 43 is support through the entire length of the tail 4.

In the preferred embodiment of the present invention, the left drogue brake 24 and the right drogue brake 25 consist of specific components that allow the present invention to efficiently and effectively steer either left or right. The left drogue brake 24 and the right drogue brake 25 each comprise an inner tube 26, an outer tube 27, a plurality of valve openings 28, and a spring 29. The inner tube 26 is telescopically engaged to the outer tube 27, which allows the inner tube 26 to slide back and forth within the outer tube 27. The inner tube 26 is also elastically connected to the outer tube 27 by the spring 29 so that the inner tube 26 returns to an equilibrium position after being moved back or forth within the outer tube 27. The inner tube 26 and the outer tube 27 each have a set of holes, which are positioned equidistant from each other along its respective tube. In the equilibrium position, the set of holes for the inner tube 26 is positioned to be offset from the set of holes for the outer tube 27, which prevents any air from entering either the left drogue brake 24 or the right drogue brake 25. When the inner tube 26 is pulled away from the equilibrium position, the set of holes for the inner tube 26 and the set of holes for the outer tube 27 become aligned with each other and allow air to enter either the left drogue brake 24 or the right drogue brake 25, which creates drag on its respective wing and causes the present invention to steer either left or right. The set of holes for inner tube 26 and the set of holes for the outer tube 27 work in conjunction as the plurality of the valve openings 28.

The inflatable bladder 21 allows the leading edge 2 of the pair of wings 1 to be rigid yet also collapsible. Thus, the inflatable bladder 21 is positioned along the leading edge 2 in between the left drogue brake 24 and the right drogue brake 25. Together, the left drogue brake 24, the right drogue brake 25, and the inflatable bladder 21 form the rigid structure of the leading edge 2. The inflatable bladder 21 is used for a majority of the leading edge 2 because the inflatable bladder 21 can be pressurized into a definite shape and is able to hold that definite shape while the present invention is in flight. The inflatable bladder 21 eliminates the need for using heavier modular pieces to hold a definite shape while the present invention is in flight. The inflation tank 22 is used to pressurize the inflatable bladder 21 while the present invention is being assembled. The inflation tank 22 is centrally mounted to the spar 6 so that the inflation tank 22 can expand the inflatable bladder 21 from the center of the spar 6 to its outer edges. While the present invention is in flight, the inflation tank 22 keeps the inflatable bladder 21 at the proper pressure so that the leading edge 2 can maintain its definite shape. The inflation tank 22 comprises a regulator 23, which is used to monitor the remaining gas within the inflation tank 22. In the preferred embodiment of the present invention, the inflation tank 22 holds nitrous oxide gas as the means to pressurize the inflatable bladder 21. In order to pressurize the inflatable bladder 21, the inflation tank 22 needs to be in fluid communication with the inflatable bladder 21 by means of a hermetically sealed pipe or another such device.

Due to a lack of nose structure in the frame 5, the pilot pod 37 carries the user in the supine position, which allows the user to shift their weight in order to control the pitch while the present invention is in flight. The pilot pod 37 is designed to be aerodynamic so that the pilot pod 37 does not produce any unnecessary drag on the present invention. The pilot pod 37 is aligned with the keel 9 so that the weight of the user is evenly distributed on the pair of wings 1 while the present invention in flight. The pilot pod 37 comprises a front support beam 38, a rear support beam 39, and a rigid harness 40. The rigid harness 40 allows the present invention to hold the user's body in the supine position so that the user's legs are stretched toward the front of the present invention. The front support beam 38 and the rear support beam 39 are used to attach the rigid harness 40 to the frame 5 and are designed to be very sturdy because the front support beam 38 and the rear support beam 39 hold a significant portion of the present invention's total weight to the spar 6. The front support beam 38 and the rear support beam 39 each comprise a first end and a second end. The first end and the second end of each support beam are connected between the keel 9 and the rigid harness 40 in different ways. The first end of the front support beam 38 is pivotally connected to the rigid harness 40, and the first end of the rear support beam 39 is pivotally connected to the rigid harness 40, which allows the front support beam 38 and the rear support beam 39 to fold inwards when the present invention is being dissembled. In addition, the first end of the front support beam 38 and the first end of the rear support beam 39 are positioned opposite of each other along the rigid harness 40, which also allows the front support beam 38 and the rear support beam 39 to be folded inwards. The second end of the front support beam 38 is attached to the keel 9, and the second end of the rear support beam 39 is attached to the keel 9. The second end of the front support beam 38 and the second end of the rear support beam 39 are positioned adjacent to each other so that the rigid harness 40, the front support beam 38, and the rear support beam 39 form a triangular shape. In the preferred embodiment of the present invention, the second end of the front support beam 38 and the second end of the rear support beam 39 are held together at the keel 9 by a pin, which is can be removed while the present invention is being dissembled.

The left steering mechanism 30 and the right steering mechanism 31 allows the user to control the yaw of the present invention while the present invention is in flight. The left steering mechanism 30 and the right steering mechanism 31 each comprise a control line 32, a down-tube 33, a vertical pulley 35, a horizontal pulley 34, and a tubular grip 36. The control line 32 is pulled by the user in order to activate its respective brake. The control line 32 traverses from its respective side of the pair of wings 1 towards the keel 9. The down-tube 33 is connected to the keel 9 and guides the control line 32 from the pair of wings 1 to the pilot pod 37 where the user can access the control line 32. The horizontal pulley 34 and the vertical pulley 35 are mounted opposite to each other along the down-tube 33. The horizontal pulley 34 is used to change the tension direction of the control line 32 from parallel to the pair of wings 1 to perpendicular to the pair of wings 1. The vertical pulley 35 is then used to change the tension direction of the control line 32 from perpendicular to the pair of wings 1 back to parallel to the pair of wings 1. The configuration of the horizontal pulley 34 and the vertical pulley 35 allows the user to efficiently and effectively activate its respective drogue brake while adjusting the yaw of the present invention in flight. Consequently, the path of the control line 32 from its respective drogue brake is to engage the horizontal pulley 34, traverse through the down-tube 33, engage the vertical pulley 35, and laterally connect to the tubular grip 36. The tubular grip 36 allows the user to apply a pulling force on the control line 32 by grasping the tubular grip 36 and pulling the tubular grip 36 away from the down-tube 33.

The respective components of the left steering mechanism 30 and the right steering mechanism 31 are configured in relation to each other so that the left steering mechanism 30 and the right steering mechanism 31 can control the yaw of the present invention in flight. The control line 32 of the left steering mechanism 30 is operatively coupled to the left drogue brake 24, and the control line 32 of the right steering mechanism 31 is operatively coupled to the right drogue brake 25, which allows the user to activate either the left drogue brake 24 or the right drogue while sitting the pilot pod 37. In the preferred embodiment of the present invention, the control line 32 would be connected to the inner tube 26 of its respective drogue brake so that the plurality of valve openings 28 would open when the control line 32 is pulled by the user. The down-tube 33 of the left steering mechanism 30 is laterally positioned to the pilot pod 37 so that the user can pull on the control line 32 of the left steering mechanism 30 with their left hand. Similarly, the down-tube 33 of the right steering mechanism 31 is laterally positioned on the pilot pod 37 so that the user can pull the control line 32 of the right steering mechanism 31 with their right hand. A guide rod 41 provides the tubular grip 36 for both the left steering mechanism 30 and the right steering mechanism 31 with a track to follow as the user applies a pulling force on the control line 32 of either the left steering mechanism 30 or the right steering mechanism 31. The tubular grip 36 of both the left steering mechanism 30 and the right steering mechanism 31 are slidable engaged to the guide rod 41 so that the user can pull the tubular grip 36 of either the left steering mechanism 30 or the right steering mechanism 31 to steer the present invention in either to the left or the right.

The present invention uses a method of collapsing its components so that the present invention can fit into a carrying case. The method begins releasing the tension in the wing skin 17 by detaching the left tip wand 13 and the right tip wand 15. The tension in the tail skin 20 should also be released. The left drogue brake 24 and the right drogue brake 25 are detached from the plurality of wing ribs 7, and the inflatable bladder 21 is depressurized so that the leading edge 2 of the pair of wings 1 can be deformed. Each control line 32 is also decoupled from the left drogue brake 24 and the right drogue brake 25. Consequently, the plurality of wing ribs 7 can then be slid along the spar 6 towards the keel 9 in order to compress the plurality of wing ribs 7, the wing skin 17, the network of lines 12, and the inflatable bladder 21. The plurality of tail ribs 11 should also be slid along the tail frame 10 towards the keel 9 in order to compress the plurality of tail ribs 11 and the tail skin 20. Next, the spar 6 is broken down into its modular components, and the tail frame 10 is detached from the keel 9. This allows the first support beam and the second support beam to be pivoted towards the rigid harness 40, which creates a compressed apparatus for a majority of the present invention. The compressed tail 4 is then positioned in between the rigid harness 40 and the plurality of wing ribs 7, and this combined apparatus is fitted into the carrying case with the modular components of the spar 6 on top. The other components of the present invention are then fitted around the carrying case.

Although the invention has been explained in relation to its preferred embodiment, it is to be understood that many other possible modifications and variations can be made without departing from the spirit and scope of the invention as hereinafter claimed.

What is claimed is:
1. A partially-inflated rigid-structure glider comprises:
   a pair of wings;
   a tail;
   a frame;
   a wing skin;
   a tail skin;
   an inflatable bladder;
   an inflation tank;
   a left drogue brake;
   a right drogue brake;
   a left steering mechanism;
   a right steering mechanism;
   a pilot pod;
   said pair of wings comprises a leading edge and a trailing edge;
   said frame comprises a spar, a plurality of wing ribs, a plurality of battens, a keel, a tail frame, a plurality of tail ribs, a network of lines, a left tip wand, and a right tip wand;
   said wing skin comprises a left brake opening and a right brake opening; and
   said left steering mechanism and said right steering mechanism each comprise a control line, a down-tube, a vertical pulley, a horizontal pulley, and a tubular grip.

2. The partially-inflated rigid-structure glider as claimed in claim 1 comprises:
   said keel being perpendicularly positioned to said spar;
   said keel being centrally attached to said spar;
   said tail frame being attached to said keel opposite of said spar;
   said plurality of wing ribs being evenly distributed along said pair of wings;
   said plurality of wing ribs being interconnected to each other through said network of lines;
   said plurality of battens being distributed in between said plurality of wing ribs;
   said plurality of wing ribs and said plurality of battens forming an airfoil shape for said pair of wings; and
   said plurality of tail ribs being evenly distributed along said tail.

3. The partially-inflated rigid-structure glider as claimed in claim 2 comprises:
   each of said plurality of battens being connected to said wing skin;
   each of said plurality of wing ribs being slidably engaged to said spar; and
   each of said plurality of tail ribs being slidably engaged to said tail frame.

4. The partially-inflated rigid-structure glider as claimed in claim 1 comprises:
   said plurality of wing ribs comprises a left outermost rib, a left second-most outer rib, a right outermost rib, and a right second-most outer rib;
   said left drogue brake being attached in between said left outermost rib and said left second-most outer rib;
   said right drogue brake being attached in between said right outermost rib and said right second-most outer rib;
   said left drogue brake and said right drogue brake being positioned along said leading edge;
   said left tip wand being attached to said left outermost rib adjacent to said left drogue brake; and
   said right tip wand being attached to said right outermost rib adjacent to said right drogue brake.

5. The partially-inflated rigid-structure glider as claimed in claim 4 comprises:
   said frame further comprises a left tip strut and a right tip strut;
   said left tip strut being attached between said left outermost rib and said left tip wand; and
   said right tip strut being attached between said right outermost rib and said right tip wand.

6. The partially-inflated rigid-structure glider as claimed in claim 1 comprises:
   said wing skin conformingly enclosing said plurality of wing ribs, said left tip wand, and said right tip wand;
   said left brake opening being positioned along said leading edge adjacent to said left drogue brake;
   said right brake opening being positioned along said leading edge adjacent to said right drogue brake; and
   said tail skin conformingly enclosing said plurality of tail ribs and said tail frame.

7. The partially-inflated rigid-structure glider as claimed in claim 1 comprises:
   both said wing skin and said tail skin being transparent;
   a wing solar panel being located within said wing skin and positioned across said pair of wings;
   said wing solar panel being connected to each of said plurality of wing ribs;
   a tail solar panel being located within said tail skin and positioned across said tail;

said tail solar panel being connected to each of said plurality of tail ribs; and said wing solar panel and said tail solar panel being foldable.

8. The partially-inflated rigid-structure glider as claimed in claim 1 comprises:

said left drogue brake and said right drogue brake each comprise an inner tube, an outer tube, a plurality of valve openings, and a spring;

said inner tube being telescopically engaged to said outer tube;

said inner tube being elastically connected to said outer tube by said spring; and said plurality of valve openings being positioned along both said inner tube and said outer tube.

9. The partially-inflated rigid-structure glider as claimed in claim 1 comprises:

said inflatable bladder being positioned along said leading edge;

said inflatable bladder being positioned in between said left drogue brake and said right drogue brake;

said inflation tank being centrally mounted to said spar; and said inflation tank being in fluid communication with said inflatable bladder.

10. The partially-inflated rigid-structure glider as claimed in claim 1 comprises:

said pilot pod being aligned with said keel;

said pilot pod comprises a front support beam, a rear support beam, and a rigid harness;

said front support beam and said rear support beam each comprise a first end and a second end;

said first end of said front support beam being pivotally connected to said rigid harness;

said first end of said rear support beam being pivotally connected to said rigid harness;

said second end of said front support beam being attached to said keel;

said second end of said rear support beam being attached to said keel; and said second end of said front support beam and said second end of said rear support beam being positioned adjacent to each other.

11. The partially-inflated rigid-structure glider as claimed in claim 1 comprises:

said down-tube being connected to said keel;

said vertical pulley and said horizontal pulley being mounted opposite to each other along said down-tube; and said control line engaging said horizontal pulley, traversing through said down-tube, engaging said horizontal pulley, and laterally connecting to said tubular grip.

12. The partially-inflated rigid-structure glider as claimed in claim 1 comprises:

said control line of said left steering mechanism being operatively coupled to said left drogue brake;

said down-tube of said left steering mechanism being laterally positioned to said pilot pod;

said control line of said right steering mechanism being operatively coupled to said right drogue brake;

said down-tube of said left steering mechanism being laterally positioned to said pilot pod;

a guide rod being connected between said down-tube of said left steering mechanism and said down-tube of said right steering mechanism; and said tubular grip of both said left steering mechanism and said right steering mechanism being slidably engaged to said guide rod.

13. A partially-inflated rigid-structure glider comprises:

a pair of wings;

a tail;

a frame;

a wing skin;

a tail skin;

an inflatable bladder;

an inflation tank;

a left drogue brake;

a right drogue brake;

a left steering mechanism;

a right steering mechanism;

a pilot pod;

said pair of wings comprises a leading edge and a trailing edge;

said frame comprises a spar, a plurality of wing ribs, a plurality of battens, a keel, a tail frame, a plurality of tail ribs, a network of lines, a left tip wand, and a right tip wand;

said wing skin comprises a left brake opening and a right brake opening;

said left steering mechanism and said right steering mechanism each comprise a control line, a down-tube, a vertical pulley, a horizontal pulley, and a tubular grip;

said plurality of wing ribs comprises a left outermost rib, a left second-most outer rib, a right outermost rib, and a right second-most outer rib;

said left drogue brake being attached in between said left outermost rib and said left second-most outer rib;

said right drogue brake being attached in between said right outermost rib and said right second-most outer rib;

said left drogue brake and said right drogue brake being positioned along said leading edge;

said left tip wand being attached to said left outermost rib adjacent to said left drogue brake;

said right tip wand being attached to said right outermost rib adjacent to said right drogue brake;

said inflatable bladder being positioned along said leading edge;

said inflatable bladder being positioned in between said left drogue brake and said right drogue brake;

said inflation tank being centrally mounted to said spar; and said inflation tank being in fluid communication with said inflatable bladder.

14. The partially-inflated rigid-structure glider as claimed in claim 13 comprises:

said keel being perpendicularly positioned to said spar;

said keel being centrally attached to said spar;

said tail frame being attached to said keel opposite of said spar;

said plurality of wing ribs being evenly distributed along said pair of wings;

said plurality of wing ribs being interconnected to each other through said network of lines;

said plurality of battens being distributed in between said plurality of wing ribs;

said plurality of wing ribs and said plurality of battens forming an airfoil shape for said pair of wings;

said plurality of tail ribs being evenly distributed along said tail;

each of said plurality of battens being connected to said wing skin;

each of said plurality of wing ribs being slidably engaged to said spar; and each of said plurality of tail ribs being slidably engaged to said tail frame.

15. The partially-inflated rigid-structure glider as claimed in claim 13 comprises:

said frame further comprises a left tip strut and a right tip strut;

said left tip strut being attached between said left outermost rib and said left tip wand;

said right tip strut being attached between said right outermost rib and said right tip wand;

said wing skin conformingly enclosing said plurality of wing ribs, said left tip wand, and said right tip wand;

said left brake opening being positioned along said leading edge adjacent to said left drogue brake;

said right brake opening being positioned along said leading edge adjacent to said right drogue brake; and said tail skin conformingly enclosing said plurality of tail ribs and said tail frame.

16. The partially-inflated rigid-structure glider as claimed in claim 13 comprises:

both said wing skin and said tail skin being transparent;

a wing solar panel being located within said wing skin and positioned across said pair of wings;

said wing solar panel being connected to each of said plurality of wing ribs;

a tail solar panel being located within said tail skin and positioned across said tail;

said tail solar panel being connected to each of said plurality of tail ribs;

said wing solar panel and said tail solar panel being foldable;

said left drogue brake and said right drogue brake each comprise an inner tube, an outer tube, a plurality of valve openings, and a spring;

said inner tube being telescopically engaged to said outer tube;

said inner tube being elastically connected to said outer tube by said spring; and said plurality of valve openings being positioned along both said inner tube and said outer tube.

17. The partially-inflated rigid-structure glider as claimed in claim 13 comprises:

said pilot pod being aligned with said keel;

said pilot pod comprises a front support beam, a rear support beam, and a rigid harness;

said front support beam and said rear support beam each comprise a first end and a second end;

said first end of said front support beam being pivotally connected to said rigid harness;

said first end of said rear support beam being pivotally connected to said rigid harness;

said second end of said front support beam being attached to said keel;

said second end of said rear support beam being attached to said keel;

said second end of said front support beam and said second end of said rear support beam being positioned adjacent to each other;

said down-tube being connected to said keel;

said vertical pulley and said horizontal pulley being mounted opposite to each other along said down-tube;

said control line engaging said horizontal pulley, traversing through said down-tube, engaging said horizontal pulley, and laterally connecting to said tubular grip;

said control line of said left steering mechanism being operatively coupled to said left drogue brake;

said down-tube of said left steering mechanism being laterally positioned to said pilot pod;

said control line of said right steering mechanism being operatively coupled to said right drogue brake;

said down-tube of said left steering mechanism being laterally positioned to said pilot pod;

a guide rod being connected between said down-tube of said left steering mechanism and said down-tube of said right steering mechanism; and said tubular grip of both said left steering mechanism and said right steering mechanism being slidably engaged to said guide rod.

* * * * *